US010255425B2

United States Patent
Raziel et al.

(10) Patent No.: US 10,255,425 B2
(45) Date of Patent: *Apr. 9, 2019

(54) SECURE AUTHENTICATION PROTOCOL SYSTEMS AND METHODS

(71) Applicant: Intel Corporation, Santa Clara, CA (US)

(72) Inventors: Michael Raziel, Jerusalem (IL); Abhilasha Bhargav-Spantzel, Santa Clara, CA (US); Hormuzd M. Khosravi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/126,342

(22) Filed: Sep. 10, 2018

(65) Prior Publication Data

US 2019/0034616 A1   Jan. 31, 2019

Related U.S. Application Data

(63) Continuation of application No. 14/866,502, filed on Sep. 25, 2015, now Pat. No. 10,073,964.

(51) Int. Cl.
*G06F 21/40* (2013.01)
*G06F 21/57* (2013.01)

(52) U.S. Cl.
CPC .............. *G06F 21/40* (2013.01); *G06F 21/57* (2013.01); *G06F 21/575* (2013.01)

(58) Field of Classification Search
None
See application file for complete search history.

(56) References Cited

U.S. PATENT DOCUMENTS

| 4,649,233 A | 3/1987 | Bass et al. |
| 5,091,939 A | 2/1992 | Cole et al. |

(Continued)

FOREIGN PATENT DOCUMENTS

| CN | 1717670 A | 1/2006 |
| CN | 101170407 A | 4/2008 |

(Continued)

OTHER PUBLICATIONS

Extended European Search Report issued in European Application No. 13865259.9, dated May 10, 2016, 6 pages. (P50094EP).

(Continued)

*Primary Examiner* — Joseph P Hirl
*Assistant Examiner* — Hassan Saadoun
(74) *Attorney, Agent, or Firm* — Grossman, Tucker, Perreault & Pfleger, PLLC (57) ABSTRACT

An input device of a secure authentication protocol system may receive at least one user authentication factor in a pre-boot session. The input device may verify the received authentication factors and may store the verified authentication factors. During a post-boot session, the input device may communicate the verified authentication factor and a stored post-boot session credential received during a prior post-boot session to an authentication engine executing in a trusted execution environment. The authentication engine verifies the received post-boot session credential is logically associated with an immediately preceding post-boot session. Upon successful verification of the received post-boot session credential, the verified authentication factors or data indicative of a successfully verified authentication factor received during the pre-boot session are used in the current post-boot session.

25 Claims, 5 Drawing Sheets

(56) References Cited

U.S. PATENT DOCUMENTS

| | | |
|---|---|---|
| 5,371,871 A | 12/1994 | Spilo |
| 5,426,775 A | 6/1995 | Boccon-Gibod |
| 5,809,230 A | 9/1998 | Pereira |
| 5,919,257 A | 7/1999 | Trostle |
| 5,943,423 A | 8/1999 | Mufftic |
| 6,009,540 A | 12/1999 | Craft et al. |
| 6,195,749 B1 | 2/2001 | Gulick |
| 6,715,073 B1 | 3/2004 | An et al. |
| 6,891,950 B1 | 5/2005 | Oomori et al. |
| 7,096,333 B2 | 8/2006 | McBrearty et al. |
| 7,103,529 B2 | 9/2006 | Zimmer |
| 7,127,579 B2 | 10/2006 | Zimmer et al. |
| 7,210,034 B2 | 4/2007 | Smith |
| 7,216,369 B2 | 5/2007 | Wiseman et al. |
| 7,299,354 B2 | 11/2007 | Zhanna et al. |
| 7,552,419 B2 | 6/2009 | Zimmer et al. |
| 7,590,867 B2 | 9/2009 | Scarlata et al. |
| 7,606,915 B1 | 10/2009 | Calinov et al. |
| 7,636,442 B2 | 12/2009 | Scarlata et al. |
| 7,657,746 B2 | 2/2010 | Paramasivam et al. |
| 7,827,371 B2 | 11/2010 | Yao et al. |
| 7,841,940 B2 | 11/2010 | Bronstein |
| 8,060,876 B2 | 11/2011 | Smith et al. |
| 8,108,668 B2 | 1/2012 | Rozas |
| 8,327,415 B2 | 12/2012 | Yao et al. |
| 8,467,770 B1 | 6/2013 | Ayed |
| 8,904,186 B2 | 12/2014 | Smith et al. |
| 9,064,109 B2 | 6/2015 | Smith et al. |
| 9,230,081 B2 | 1/2016 | Smith et al. |
| 2001/0037379 A1 | 11/2001 | Livnat |
| 2002/0184491 A1 | 12/2002 | Morgan et al. |
| 2002/0194496 A1 | 12/2002 | Griffin et al. |
| 2003/0023812 A1 | 1/2003 | Nalawadi et al. |
| 2003/0188193 A1 | 10/2003 | Venkataramappa |
| 2004/0039937 A1 | 2/2004 | Aissi et al. |
| 2004/0167894 A1 | 8/2004 | Ziv |
| 2004/0215735 A1 | 10/2004 | Nakahara et al. |
| 2004/0268140 A1 | 12/2004 | Zimmer et al. |
| 2005/0021968 A1 | 1/2005 | Zimmer et al. |
| 2005/0060568 A1 | 3/2005 | Beresnevichiene et al. |
| 2005/0063544 A1 | 3/2005 | Uusitalo et al. |
| 2005/0144609 A1 | 6/2005 | Rothman et al. |
| 2005/0210467 A1 | 9/2005 | Zimmer et al. |
| 2005/0228993 A1 | 10/2005 | Silvester et al. |
| 2005/0246552 A1 | 11/2005 | Bade et al. |
| 2006/0015358 A1 | 1/2006 | Chua |
| 2006/0015717 A1 | 1/2006 | Zhengrong et al. |
| 2006/0020781 A1 | 1/2006 | Scarlata et al. |
| 2006/0021018 A1 | 1/2006 | Hinton et al. |
| 2006/0190985 A1 | 8/2006 | Vasishth et al. |
| 2006/0224878 A1 | 10/2006 | Datta et al. |
| 2006/0230439 A1 | 10/2006 | Smith et al. |
| 2006/0242280 A1 | 10/2006 | Zimmer et al. |
| 2006/0259782 A1 | 11/2006 | Wang et al. |
| 2006/0288202 A1 | 12/2006 | Doran et al. |
| 2007/0016766 A1 | 1/2007 | Richmond et al. |
| 2007/0016801 A1 | 1/2007 | Bade et al. |
| 2007/0055856 A1 | 3/2007 | Zimmer et al. |
| 2007/0061561 A1 | 3/2007 | Hashiguchi |
| 2007/0106986 A1 | 5/2007 | Worley |
| 2007/0107048 A1 | 5/2007 | Halls et al. |
| 2007/0112772 A1 | 5/2007 | Morgan et al. |
| 2007/0179905 A1 | 8/2007 | Buch et al. |
| 2007/0198844 A1 | 8/2007 | Marawetz et al. |
| 2007/0226786 A1 | 9/2007 | Berger et al. |
| 2007/0239604 A1 | 10/2007 | O'Connell et al. |
| 2007/0255948 A1 | 11/2007 | Ali et al. |
| 2007/0282757 A1 | 12/2007 | Pandya et al. |
| 2007/0300069 A1 | 12/2007 | Rozas |
| 2008/0022108 A1 | 1/2008 | Brannock et al. |
| 2008/0052777 A1 | 2/2008 | Kawano et al. |
| 2008/0083019 A1 | 4/2008 | Wang et al. |
| 2008/0120499 A1 | 5/2008 | Zimmer et al. |
| 2008/0123862 A1 | 5/2008 | Rowley |
| 2008/0126779 A1 | 5/2008 | Smith |
| 2008/0130879 A1 | 6/2008 | Heinonen et al. |
| 2008/0155277 A1 | 6/2008 | Bulusu et al. |
| 2008/0158000 A1 | 7/2008 | Mattrazzo |
| 2008/0162809 A1 | 7/2008 | Rothman et al. |
| 2008/0175379 A1 | 7/2008 | Hansen et al. |
| 2008/0175393 A1 | 7/2008 | Oba et al. |
| 2008/0178176 A1 | 7/2008 | Berger et al. |
| 2008/0244292 A1 | 10/2008 | Kumar et al. |
| 2008/0244569 A1 | 10/2008 | Challener et al. |
| 2008/0263636 A1 | 10/2008 | Gusler et al. |
| 2008/0271015 A1 | 10/2008 | Ibrahim |
| 2008/0288782 A1 | 11/2008 | Iyer |
| 2009/0006859 A1 | 1/2009 | Zimmer et al. |
| 2009/0063799 A1 | 3/2009 | Berenbaum et al. |
| 2009/0067685 A1 | 3/2009 | Boshra et al. |
| 2009/0067688 A1 | 3/2009 | Boshra et al. |
| 2009/0070467 A1 | 3/2009 | Khosravi et al. |
| 2009/0110200 A1 | 4/2009 | Srinivas |
| 2009/0132837 A1 | 5/2009 | Kumar |
| 2009/0153292 A1 | 6/2009 | Farb |
| 2009/0172381 A1 | 7/2009 | Zimmer et al. |
| 2009/0172438 A1 | 7/2009 | Kumar |
| 2009/0180430 A1 | 7/2009 | Fadell |
| 2009/0259848 A1 | 10/2009 | Williams et al. |
| 2009/0292924 A1 | 11/2009 | Johnson et al. |
| 2009/0319806 A1 | 12/2009 | Smith et al. |
| 2009/0327678 A1 | 12/2009 | Dutton et al. |
| 2010/0023782 A1 | 1/2010 | Prakash et al. |
| 2010/0023865 A1 | 1/2010 | Fulker et al. |
| 2010/0066821 A1 | 3/2010 | Rosener et al. |
| 2010/0082987 A1 | 4/2010 | Thom et al. |
| 2010/0107238 A1 | 4/2010 | Stedman et al. |
| 2010/0169640 A1 | 7/2010 | Smith et al. |
| 2010/0310077 A1 | 12/2010 | Sun et al. |
| 2011/0067095 A1 | 3/2011 | Leicher et al. |
| 2011/0080529 A1 | 4/2011 | Wong |
| 2011/0138166 A1 | 6/2011 | Peszek et al. |
| 2011/0145598 A1 | 6/2011 | Smith |
| 2011/0154023 A1 | 6/2011 | Smith et al. |
| 2011/0180686 A1 | 7/2011 | Iwai |
| 2011/0191834 A1 | 8/2011 | Singh et al. |
| 2011/0246817 A1 | 10/2011 | Orsini et al. |
| 2011/0289564 A1 | 11/2011 | Archer et al. |
| 2011/0296183 A1 | 12/2011 | Banerjee et al. |
| 2012/0017271 A1 | 1/2012 | Smith et al. |
| 2012/0030730 A1 | 2/2012 | Smith et al. |
| 2012/0079271 A1 | 3/2012 | Cordeiro et al. |
| 2012/0144193 A1 | 6/2012 | Le Saint et al. |
| 2013/0013931 A1 | 1/2013 | O'Hare et al. |
| 2013/0051632 A1 | 2/2013 | Tsai et al. |
| 2013/0055379 A1 | 2/2013 | Adams et al. |
| 2013/0227651 A1 | 8/2013 | Schultz et al. |
| 2013/0248717 A1 | 9/2013 | Moore et al. |
| 2013/0281055 A1 | 10/2013 | Patefield-Smith et al. |
| 2013/0340063 A1 | 12/2013 | Larsson |
| 2013/0347058 A1 | 12/2013 | Smith |
| 2013/0347087 A1 | 12/2013 | Smith |
| 2014/0007253 A1 | 1/2014 | Hardt |
| 2014/0181925 A1 | 6/2014 | Smith et al. |
| 2014/0366111 A1 | 12/2014 | Sheller et al. |
| 2015/0079933 A1 | 3/2015 | Smith et al. |
| 2015/0082024 A1 | 3/2015 | Smith |
| 2015/0341332 A1 | 11/2015 | Smith et al. |
| 2016/0066184 A1 | 3/2016 | Bhargav-Spantzel et al. |
| 2016/0125180 A1 | 5/2016 | Smith et al. |
| 2016/0127351 A1 | 5/2016 | Smith et al. |
| 2016/0180068 A1 | 6/2016 | Das et al. |
| 2016/0350761 A1 | 12/2016 | Raziel et al. |
| 2017/0214526 A1 | 7/2017 | Smith et al. |

FOREIGN PATENT DOCUMENTS

| | | |
|---|---|---|
| EP | 2194476 A1 | 6/2010 |
| KR | 100705380 B1 | 4/2007 |
| WO | 2001-086393 A3 | 11/2001 |
| WO | 2012009231 A2 | 1/2012 |
| WO | 2012-087844 A1 | 6/2012 |
| WO | 2012-122175 A1 | 9/2012 |
| WO | 2013048434 A1 | 4/2013 |

(56) References Cited

FOREIGN PATENT DOCUMENTS

| WO | 2013095434 | 6/2013 |
|---|---|---|
| WO | 2013-100961 A1 | 7/2013 |
| WO | 2014142947 | 9/2014 |
| WO | 2014209322 | 12/2014 |
| WO | 2015041654 | 3/2015 |
| WO | 2015041658 | 3/2015 |

OTHER PUBLICATIONS

Korean Office Action issued in Korean Application No. 2015-7033725, dated Sep. 13, 2016, with English translation, 12 pages. (P54767KR).
Korean Office Action issued in Korean Application No. 2015-7013180, dated Mar. 16, 2016, with English translation, 14 pages. (P50094KR).
Song, Jun-hong, et al.: "Design of SAML Authority System based on Web Service", Korea Information Science Society Workshop Presentation File 29(21), Oct. 2002, 4 pages (P50094KR).
Wikipedia.Org: "Security Assertion markup Language", 11 pages.
Intel, White Paper, "Trusted Execution Technology, Hardware-based Technology for Enhancing Server Platform Security" 2010, 8 pages.
Intel Corporation: "Trusted Execution Technology (Intel TXT), software Development Guide, Measured Launched Environment Developer's Guide", Mar. 2014, 99 pages.
Intel, "Trusted Execution Technology Architectural Overview", 2003, 8 pages.
International Search Report and Written Opinion issued in PCT Application No. PCT/US2013/072911, dated Apr. 7, 2014, 12 pages.
Extended European Search Report issued in European Application No. 13887611.5, dated Jan. 5, 2017, 11 pages. (P54767US).
Korean Office Action issued in Korean Application No. 10-2015-7033725, dated Feb. 28, 2017, with English translation, 6 pages. (P54767US)
International Search Report and Written Opinion issued in PCT Application No. PCT/US2013/074623, dated Sep. 2, 2015, 14 pages.
International Search Report and Written Opinion issued in PCT Application No. PCT/US2015/037623, dated Oct. 7, 2015, 11 pages.
Wikipedia.org, "IEEE.802.11i-2004", downloaded Jul. 17, 2017, 4 pages.
McKeen, Frank, et al., "Innovative instructions and Software Model for Isolated Execution", Aug. 14, 2013, 21 pages.
Hoekstra, Frank, et al.: "Using Innovative Instructions to Create Trustworthy Software Solutions", 2013, pp. 1-8.
Anati, Ittai, et al.: "Innovative Technology for CPU Based Attestation and Sealing", Aug. 14, 2013, 16 pages.
Balfanz, Dirk: "FIDO U2F Raw message Formats", FIDO Alliance Proposed Standard, May 14, 2015, 10 pages.
Lindemann, Rolf: "FIDO Security Reference", FIDO Alliance Proposed Standard, May 14, 2015, 30 pages.
Balfanz, Dirk: "FIDO U2F Implementation Considerations", FIDO Alliance Proposed Standard, May 14, 2015, 5 pages.
Balfanz, Dirk: "FIDO U2F Javascript API", FIDO Alliance Proposed Standard, May 14, 2015, 7 pages.
Czeskis, Alexei: "FIDO NFC Protocol Specification v1.0", FIDO Alliance Proposed Standard, May 14, 2015, 5 pages.
Srinivas, Sampath: "Universal 2nd Factor (U2F) Overview", FIDO Alliance Proposed Standard, May 14, 2015, 137 pages.
Manchani, Salah, et al.: "FIDO UAF Review Draft Spec Set", FIDO Alliance Proposed Standard, Dec. 2014, 202 pages.
Wikipedia.org: "Kerberos (protocol)", downloaded Jul. 18, 2017, 8 pages.
Wikipedia.org: "Hardware security module", downloaded Jul. 18, 2017, 5 pages.
Smith: Identity Protection Technology, PC client Group, Massachusetts Institute of Technology, Oct. 25-26, 2011, 22 pages.
Trusted Computing Group, Inc.: "TPM Main Part 1 Design Principles", Specification Version 1.2, level 2, Revision 116, Mar. 1, 2011, 184 pages.
Trusted Computing Group, Inc.: "TPM Main Part 2 TPM Structures", Specification Version 1.2, level 2, Revision 116, Mar. 1, 2011, 201 pages.
Trusted Computing Group, Inc.: "TPM Main Part 3 Commands", Specification Version 1.2, level 2, Revision 116, Mar. 1, 2011, 339 pages.
Sirbu, et al.: "Distributed Authentication in Kerberos Using Public Key Cryptography", IEEE Computer Society Press, 1997, 8 pages.
Krawczyk: "Sigma: the 'SIGn-and-MAc' Approach to Authenticated Diffie-Hellman and its Use in the IKE Protocols", Proceedings of 23rd Annual Int. Cryptology Conferences, Aug. 17-21, 2003, 26 pages.
MIT Kerberos Consortium: "Best Practices for Integrating Kerberos into Your Application ", Jul. 23, 2008, 27 pages.
MIT Kerberos Consortium: "The Role of Kerberos in Modem Information Systems", 2008, 53 pages.
Scarfone, et al.: "Guide to Storage Encryption Technologies for End User Devices" NIST Pub. 800-111, Nov. 2007, 40 pages.
Zhu, et al.: "RFC 4556: Public Key Cryptography for Initial Authentication in Kerberos (PKINIT)", Jun. 2006, 42 pages.
Cervesato, et al.: "Breaking and Fixing Public-Key Kerberos", ScienceDirect, Nov. 10, 2006, 23 pages.
Neuman, et al.: "RCF 1510: The Kerberos Network Authentication Service (V5)", Jul. 2005, 138 pages.
Oasis: "Assertions and Protocols for the Oasis Security Assertion Markup Language (SAML)", V2.0, Oasis Standard, Mar. 15, 2005, 86 pages.
Oasis: "Kerberos SAML Profiles", Working draft, Feb. 10, 2004, 13 pages.
Worldtel Inc. "C.O.B.A.S. Centralized Out-Of-Bank, Authentication System", Southeast Europe Cybersecurity Conference, Sep. 8-9, 2003, 14 pages.
Notice of Allowance issued in U.S. Appl. No. 14/714,513, dated Nov. 3, 2016, 31 pages.
Notice of Allowance issued in U.S. Appl. No. 13/721,760, dated Feb. 17, 2015, 8 pages.
Office Action issued in U.S. Appl. No. 13/721,760, dated Oct. 2, 2014, 32 pages.
Final Office Action issued in U.S. Appl. No. 14/129,443, dated Sep. 21, 2016, 16 pages.
Notice of Allowance issued in U.S. Appl. No. 14/129,443, dated Mar. 10, 2017, 18 pages.
Notice of Allowance issued in U.S. Appl. No. 14/129,443, dated Apr. 21, 2017, 6 pages.
Office Action issued in U.S. Appl. No. 14/129,443, dated Apr. 8, 2016, 35 pages.
Final Office Action issued in U.S. Appl. No. 14/361,877, dated Oct. 26, 2016, 18 pages.
Office Action issued in U.S. Appl. No. 14/361,877, dated Mar. 9, 2017, 18 pages.
Office Action issued in U.S. Appl. No. 14/361,877, dated Apr. 13, 2016, 19 pages.
Final Office Action issued in U.S. Appl. No. 14/580,817, dated May 11, 2017, 45 pages.
Final Office Action issued in U.S. Appl. No. 14/580,817, dated Jun. 20, 2016, 30 pages.
Office Action issued in U.S. Appl. No. 14/580,817, dated Feb. 1, 2016, 29 pages.
Office Action issued in U.S. Appl. No. 14/580,817, dated Nov. 3, 2016, 28 pages.
Final Office Action issued in U.S. Appl. No. 14/472,645, dated May 5, 2016, 33 pages.
Office Action issued in U.S. Appl. No. 14/472,645, dated May 18, 2017, 35 pages.
Office Action issued in U.S. Appl. No. 14/472,645, dated Oct. 15, 2015, 30 pages.
KIMTAG.COM: "NFC Tags Explained", Jan. 25, 2013, 3 pages.

SECURE AUTHENTICATION PROTOCOL SYSTEMS AND METHODS

TECHNICAL FIELD

The present disclosure relates to secure authentication protocols.

BACKGROUND

Identity theft and identity protection are major issues and define a significant goals for the computer industry. One issue in identity protection and theft is protecting biometric and bio-behavioral data and verifying received biometric and/or bio-behavioral data in a manner that ensures the integrity and trustworthiness of the data. As processing speeds have increased, brute force attacks represent a significant and growing threat. Developments such as general-purpose computing on graphics processing units (GPGPU) password cracking and rainbow tables (precomputed tables for reversing cryptographic hash functions, usually for cracking password hashes) may be used advantageously to crack passwords and gain unauthorized access to a target. GPGPU cracking may produce upwards of half a billion (500,000,000) passwords per second even on lower end graphical processing hardware. Rainbow tables may be used to crack 14 character alphanumeric passwords in less than three minutes. Purpose built field-programmable gate arrays (FPGAs) may reduce the time needed to crack passwords even further.

Multifactor authentication (MFA) employs a layered defense to increase the difficulty and reduce the likelihood of unauthorized access to a target such as a physical location, computing device, network, or database. MFA typically combines two or more independent credentials such that if one credential is compromised or broken, the attacker must still overcome one additional credential before access to the target is provided. Example MFAs include swiping a card or other object and entering a personal identification number, logging into a Website and being requested to enter a one-time code delivered using an out-of-band (i.e., cell phone) device, and similar.

Authentication factors are a category of credential used for identity verification. In MFA applications, each additional authentication factor increases the assurance that an entity requesting access to a resource is who they actually purport to be. The three most common categories of authentication factors include something that you know (the knowledge factor), something that you have in your possession (the possession factor), and something that you are (the inherence factor).

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

A cryptographic trusted channel/protocol may be established between a data acquisition device and a trusted execution environment (TEE) or other device performing the actual authentication. Such a trusted protocol channel enables an end user to securely log-in to an operating system or similar post-boot environment using information such as authentication factors that are collected during a pre-boot phase prior to creation of the post-boot environment. To provide a high level of security and trust, both the matching algorithms and the authentication policy should be protected and performed within a trusted execution environment (TEE). The initial verification of the user-supplied authentication factor may be performed within the hardware/firmware/software of the input device that receives or otherwise acquires the authentication factor from the user. The authentication policy may be executed within the protected environment, such as the INTEL® Management Engine (ME)/INTEL® Converged Security and Manageability Engine (CSME)/INTEL® Software Guard Extensions (SGX)—(INTEL CORPORATION, Santa Clara, Calif.) or similar secure environments.

The ability to use authentication information provided by the user during a pre-boot phase to provide the user with post-boot system access provides many advantages. Such a system improves user convenience by performing single sign-on (SSO) identification on a pre-boot level and without the need to perform re-identification. The use of a trusted channel provides security sufficient to use the authentication factors collected and verified during the pre-boot phase may be trusted to provide user access to the post-boot environment. The use of authentication factors in the MFA provides flexibility for adaptive IT policies and developments in authentication factor input devices to provide users with a wide variety of potential login methods. Such methods also provide a secure asynchronous information sharing to authenticate once in a pre-boot phase and reuse the authentication information again in the post-boot phase to provide user access to the post-boot environment. Further, the light-weight crypto primitives used in the protocol facilitate the use of such systems in wearables and other devices having reduced processing capabilities or memory capacities.

A system for transferring authentication protocols between a sensor and a platform is provided. The system may include a first input device to, during a pre-boot session, verify received data representative of a first authentication factor, store the verified first authentication factor, and store a credential logically associated with a prior session. The system may further include at least one circuit communicably coupled to the first input device. The system may additionally include a data storage device communicably coupled to the at least one circuit, the data storage device including machine-readable instructions that, when executed by the at least one circuit, causes the at least one circuit to provide an authentication engine and causes the authentication engine to, during a current post-boot session, communicate a challenge to the first input device, receive a payload that includes the verified first authentication factor or data indicative of the verified first authentication factor and the prior session credential from the first input device in response to the communicated challenge, and verify the prior session credential received from the first input device. In so doing, the asynchronous challenge response (i.e., the prior session credential) may be received using a secure channel created by the trusted execution environment in the current session based on the communication of the challenge response to the first input device using a secure channel created by the trusted execution environment in the immediately preceding session (i.e., in two temporally different, but trusted, execution environments created during two temporally different sessions).

An authentication method is provided. The method may include, during a pre-boot session, verifying, by a first input device, a first authentication factor, storing, by the first input device, the verified first authentication factor, and storing, by the first input device, a credential logically associated with a prior post-boot session. The method may further include, during a current post-boot session, generating, by an authentication engine, a query, communicating, by the authentication engine, the query to the first input device, receiving, by the authentication engine, the verified first user authentication data and the prior post-boot session credential from the first input device in response to the communicated query, and verifying, by the authentication engine, the received prior post-boot session credential. Beneficially, the prior post-boot session credential may be unique to the respective session, and no two sessions may have the same post-boot session credential to protect against reuse or replay of the credential to gain unauthorized system access in a subsequent session.

An authentication system is provided. The system may include, during a pre-boot session, a means for verifying a first authentication factor, a means for storing the first authentication factor, and a means for storing a credential logically associated with a prior post-boot session. The system may further include, during a current post-boot session, a means for generating a query, a means for communicating the generated query to a first input device, a means for receiving the verified first user authentication data and the prior post-boot session credential from the first input device in response to the communicated query, and a means for verifying the received prior post-boot session credential.

A storage device that includes machine-readable instructions is provided. The storage device includes machine-readable instructions, that when executed by a circuit, cause the circuit to, during a pre-boot session, cause a first input device to, verify a first authentication factor, store the first authentication factor, and store a credential logically associated with a prior post-boot session. The storage device may further include machine-readable instructions that, during a current post-boot session, may cause an authentication engine to generate a query, communicate the generated query to the first input device, receive the verified first user authentication data and the prior post-boot session credential from the first input device in response to the communicated query, and verify the received prior post-boot session credential.

As used herein, the term "pre-boot environment" and events described as occurring in the "pre-boot environment" refers to an interval, phase, or similar temporal period or variable duration that occurs prior to the point in a bootstrap routine where an operating system is loaded into the system.

As used herein, the term "post-boot environment" and events described as occurring in the "post-boot environment" refer to an interval, phase, or similar temporal period or variable duration that occurs subsequent to the point in a bootstrap routine where an operating system is loaded into the system.

Figure 1:
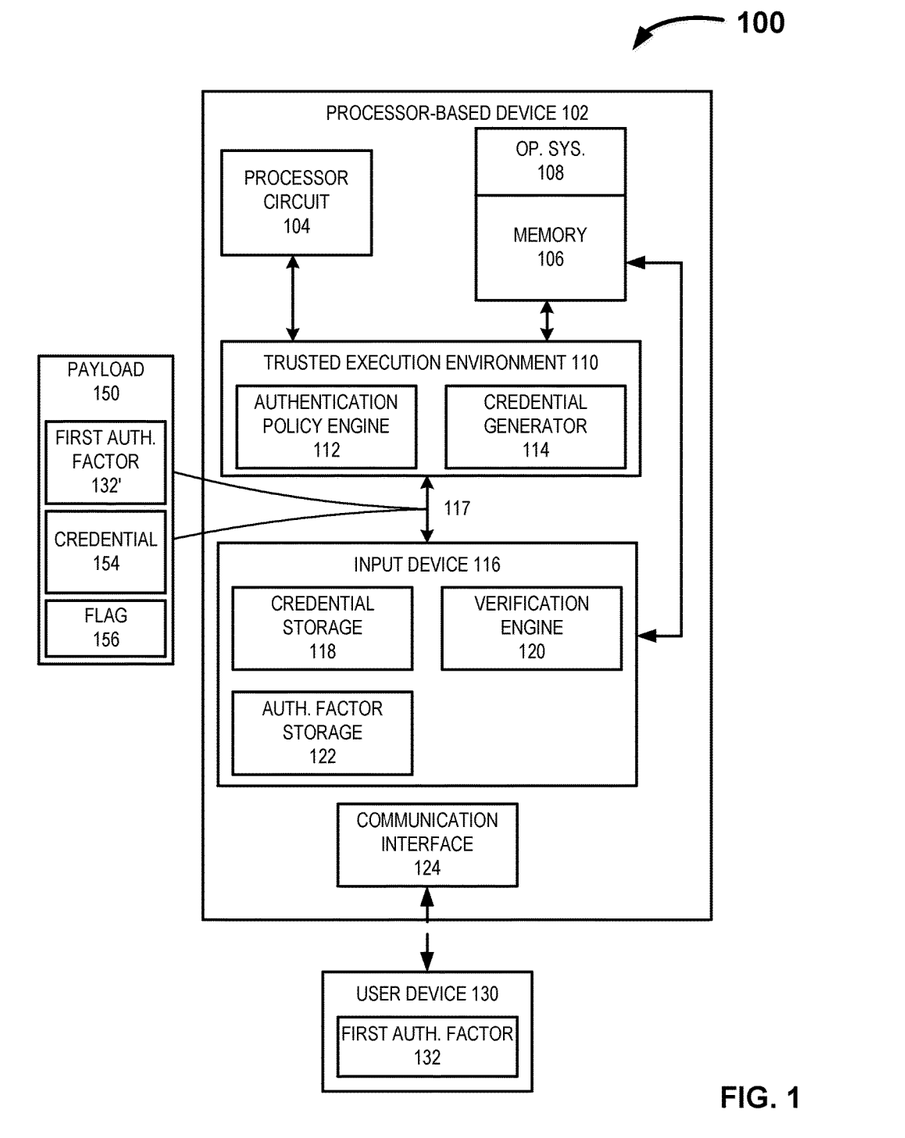
FIG. 1 is a block diagram of an illustrative system using a secure authentication protocol that uses authentication information collected pre-boot to securely provide post-boot system access, in accordance with at least one embodiment of the present disclosure.

FIG. 1 is a block diagram of an illustrative system 100 that includes a processor-based device 102 in which user access to a post-boot environment is provided using authentication information such as one or more user-supplied authentication factors supplied to the system in a pre-boot environment by one or more input devices 116, in accordance with at least one embodiment of the present disclosure. In some implementations, the processor-based device 102 may enter, initiate, or otherwise commence the pre-boot environment responsive to a user providing one or more authentication factors to the processor-based device 102. Such authentication factors may include, but are not limited to, one or more knowledge factors, one or more possession factors, one or more inherence factors, one or more location factors, and/or one or more time or temporal factors.

Example knowledge factors include, but are not limited to, information the user provides to commence the pre-boot sequence on or log-in to the processor-based device 102 (user name, user ID, password, personal identification number, answers to secret questions, etc.). Example possession factors include, but are not limited to, any object that the user has in their possession to commence the pre-boot sequence on or log-in to the device 102 (security token, one-time password, key fob, identification card, a portable device 130 assigned to the user such as a smartphone, etc.). Example inherence factors include, but are not limited to, physiological or biological traits or characteristics associated with a user that are scanned or otherwise obtained to commence the pre-boot sequence on or log-in to the processor-based device 102 (retina scan, iris scan, fingerprint scan, finger vein scan, facial recognition, voice recognition, etc.). Example location factors include, but are not limited to, relative or absolute geolocation data associated with the user that is scanned or otherwise obtained to commence the pre-boot sequence on or log-in to the device 102 (global positioning system (GPS) data, global navigation satellite system (GLONASS) data, European Space Agency's Galileo data, etc.).

In some implementations, a user may provide one or more authentication factors using one or more input devices 116 disposed in, on, or about the processor-based device 102. In some implementations, at least some of the input devices 116 may include one or more sensors such as one or more fingerprint sensors, one or more retinal scanners, one or more facial recognition scanners, or the like. In some implementations, at least some of the input devices 116 may include a keyboard, touchscreen, or similar user interface. In some implementations, at least some of the input devices 116 may include one or more wired or wireless proximity or similar sensors and/or transceivers (e.g., near field communication, BLUETOOTH®, or similar) or communications interfaces 122 capable of detecting one or more possession factors such as the user device 130, a key fob, identification card, or similar device logically associated with a particular user. In some implementations, the input device 116 may include a verification engine 120 to verify the received user authentication factors prior to commencing or entering the pre-boot environment. In some implementations, the input device 116 may store the received user credentials and/or the verified user credentials in a non-transitory storage device such as authentication factor storage 122.

In addition to storing one or more user-supplied authentication factors, the at least one input device 116 may also store one or more credentials provided by a credential generator 114. In some implementations the credential generator 114 may generate a credential such as a signed value. In some implementations, the credential generator 114 may generate a random or pseudo-random value such as a nonce value. The one or more credentials may, in embodiments, include a unique identifier, such as a pseudorandom alphanumeric string of defined length that is logically associated with the current post-boot environment. Thus, each time the processor-based device 102 enters or otherwise initiates a new post-boot environment, the credential generator 114 may generate a credential that is logically associated with the respective, newly created, post-boot environment. In some embodiments, the input device 118 may include a credential storage 118 that receives the credential generated by the credential generator 114.

In some implementations, prior to executing an operating system 108 stored in the memory 106 and initiating the current post-boot environment, the processor circuit 104 may initiate a trusted execution environment (TEE) 110 and communicate a query or challenge to the input device 116. In such implementations, the input device 116 may respond to the query or challenge by communicating 117 a payload 150 that includes at least the verified first authentication factor 132' stored in the authentication factor storage 122 and, if available, a prior post-boot session credential 154 generated in a prior post-boot session and stored in the credential storage 118 to an authentication policy engine 112. In some implementations, the payload 150 may include data indicative of the successful verification of the first authentication factor 132 (e.g., payload 150 may include data indicative of a successfully verified biometric authentication factor rather than data representative of the biometric authentication factor itself).

In some implementations, the processor circuit 104 may execute the authentication policy engine 112 in the TEE 110. In some instances, the input device 116 may include one or more logical indicators or flags 156 with the payload 150 to indicate the presence of the credential. Responsive to receiving a payload 150 that includes a logical indicator or flag 156 indicative of the presence of a prior post-boot session credential 154, the authentication policy engine 112 may verify the prior post-boot session credential 154 against a credential logically known associated with a prior post-boot environment. In some implementations, the prior post-boot session credential may include a unique nonce value generated by the credential generator 114 that is logically associated with the respective post-boot session. In some implementations, the authentication policy engine 112 may verify the prior post-boot session credential 154 included in the payload 150 corresponds to or matches the prior post-boot session credential 154 logically associated with an immediately preceding or previous post-boot environment. In some implementations, the authentication policy engine 112 may verify the prior post-boot session credential 154 included in the payload 150 against a credential logically associated with an immediately preceding or previous post-boot environment that includes a defined change, alteration, or modification (e.g., the prior post-boot session credential 154 logically associated with an immediately preceding or previous post-boot environment is incremented or decremented by a defined value).

In embodiments, if the authentication policy engine 112 successfully verifies the prior post-boot session credential 154 included in the payload 150, the processor circuit 104 may use the verified first authentication factor 132' included in the payload 150 to execute a boot sequence and initiate the current post-boot environment. On the other hand, if the authentication policy engine 112 is unsuccessful in verifying the prior post-boot session credential 154 included in the payload 150 (e.g., no prior post-boot session credential 154 is supplied in the payload 150 or the prior post-boot session credential 154 supplied in the payload 150 is from a prior post-boot environment but not an immediately preceding post-boot environment), the processor circuit 104 may prompt the system user to provide a second user-supplied authentication factor prior to executing the boot sequence and initiating a post-boot environment. In some implementations, the second user-supplied authentication factor may be different than the first user-supplied authentication factor (e.g., the first authentication factor may be a user name/password combination and the second authentication factor may be an answer to a secret question). In some implementations, the second user-supplied authentication factor may be the same as the first user-supplied authentication factor (e.g., the user may be prompted to rescan their fingerprint).

Upon entering the post-boot environment, a credential generator 114 executing in the trusted execution environment (TEE) 110 may generate a new credential logically associated with the current post-boot environment, such as a new unique identifier. In some implementations, the prior post-boot session credential 154 logically associated with the current post-boot environment may be communicated to the input device 116 and stored in the credential storage 118. In some implementations, the prior post-boot session credential 154 logically associated with the current post-boot environment may overwrite, delete, or otherwise erase the prior post-boot session credential 154 logically associated with the prior post-boot environment stored in the credential storage 118.

Figure 2:
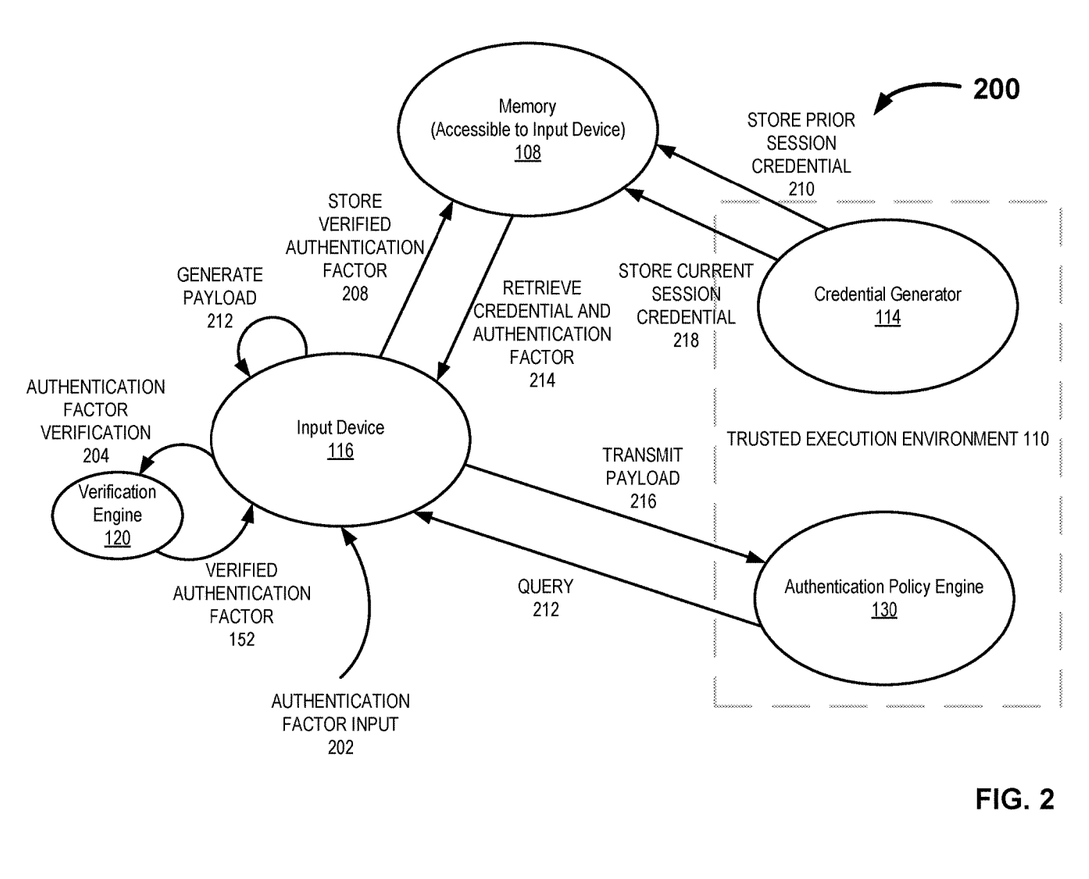
FIG. 2 is a state diagram of an illustrative system using a secure authentication protocol that uses authentication information collected pre-boot to securely provide post-boot system access, in accordance with at least one embodiment of the present disclosure.

FIG. 2 depicts a state diagram of an illustrative system 200 using a secure authentication protocol that uses authentication information collected pre-boot to securely provide post-boot system access, in accordance with at least one embodiment of the present disclosure. In embodiments, in the pre-boot environment, a user may provide or otherwise input 202 a first authentication factor 132 via the input device 116. The first authentication factor 132 may include one or more of the following: a knowledge authentication factor, a possession authentication factor, an inherence authentication factor, a location authentication factor, or a time authentication factor.

Upon receipt of the first authentication factor 132, the input device 116 verifies 204 the received authentication factor using verification engine 120. In some implementations, the input device 116 may verify 204 the first authentication factor 132 prior to commencing the pre-boot routine or sequence. Upon successful verification 204 of the first authentication factor 132, the pre-boot routine or sequence is completed. If the first authentication factor 132 cannot be verified, in some instances, the input device may solicit resubmission of the first authentication factor by the user (e.g., user name/password combination). If the first authentication factor 132 cannot be verified, in some instances, the input device may autonomously reacquire the first authentication factor 132 without user involvement (e.g., re-read of an ID card, key fob, or near field communication device).

Upon successful verification of the first authentication factor 132, the input device 116 may store 208 the verified first authentication factor 206. In at least some implementations, the input device 116 may store 208 the data representative of the verified first authentication factor 132' in whole or in part within the memory 108. In some instances, the location used to store the data representative of the verified first authentication factor 132' in the memory 108 may be accessible in both the pre-boot environment and the post-boot environment. In at least some implementations, in a prior post-boot environment, the processor circuit 104 may cause the credential generator 114 to store 210 the prior post-boot session credential 154 in memory 108 at a location accessible to the input device 116.

In preparation for execution of the boot sequence and subsequent initiation of the post-boot environment, the processor circuit 104 may execute an authentication policy engine 130. In at least some implementations, the processor circuit 104 may implement the authentication policy engine 130 in the trusted execution environment 110. Prior to initiating the post-boot environment, the processor circuit 104 may cause the authentication policy engine 130 to communicate 212 a challenge or query to the input device 116.

In response to the query or challenge, the input circuit 116 may generate a payload 150 that includes at least data representative of the verified first authentication factor 132' and, if available, data representative of the prior post-boot session credential 154. In some implementations, upon successful retrieval of the data representative of the prior post-boot session credential 154 from the memory 108, the input device 116 may include in the payload 150 a logical flag or similar indicator 156 denoting the presence of the prior post-boot session credential 154. In embodiments, the input device 116 may retrieve 214 the data representative of the verified first authentication factor 132' and the data representative of the prior post-boot session credential 154 from the memory 108. The input device 116 may generate 212 the payload 150 using the retrieved data representative of the verified first authentication factor 132' and the data representative of the prior post-boot session credential 154.

The input device 116 may communicate or otherwise transmit 216 the payload 150 that includes at least data representative of the verified first authentication factor 132' and may include data representative of the prior post-boot session credential 154 and logical indicator 156. In some implementations, upon successful implementation of the current post-boot session, the credential generator 114 may autonomously generate a random or pseudo-random credential. The processor circuit 104 may logically associate the autonomously generated credential with the current post-boot session and may cause the credential generator 114 to store 218 the credential logically associated with the current post-boot session in the memory 108.

Figure 3:
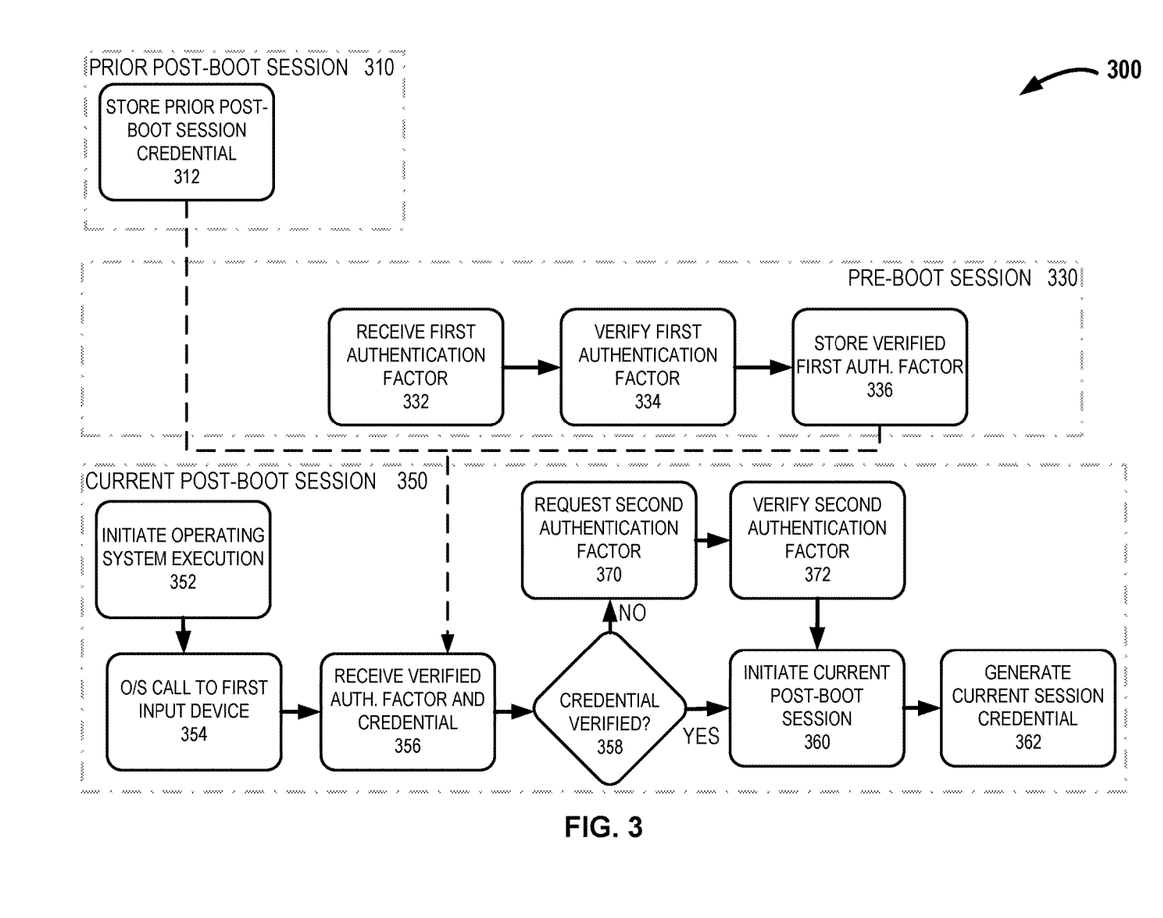
FIG. 3 is a block diagram of an illustrative method in which a secure authentication system uses authentication information collected pre-boot to securely provide post-boot system access, in accordance with at least one embodiment of the present disclosure.

FIG. 3 is a block diagram of an illustrative method 300 apportioned into a pre-boot session 310 and a post-boot session 350 in which a secure authentication system uses authentication information collected during the pre-boot session to securely provide user access to the post-boot session, in accordance with at least one embodiment of the present disclosure. In a prior post-boot session 310, the processor circuit 104 may cause the credential generator 114 operating in the trusted execution environment 110 to store the post-boot session credential 312 logically associated with the respective prior post-boot session 310 in the memory 108. At the conclusion of the prior post-boot session 310, the post-boot session credential 312 remains stored or otherwise retained in a non-volatile state in the memory 108.

Upon initiation of a new pre-boot session 330, the input device 116 may receive 332 one or more first authentication factors 132 provided by a system user. The input device 116 may cause a verification engine 120 to verify 334 the received first authentication factor 132. Upon successful verification of the received first authentication factor 132 by the verification engine 120, the input device 116 may store 336 the verified first authentication factor 132' in the memory 108.

In embodiments, upon initiation of the current post-boot session 350, the processor circuit 104 may initiate 352 the execution of an operating system. The operating system may generate a query, challenge, or call 354 to the input device 116 to retrieve data representative of the verified first authentication factor 132' and data representative of the prior post-boot session credential 154 stored at some point during the prior post-boot session 310. In embodiments, as part of the boot process, the processor circuit 104 may cause the execution of the authentication policy engine 112 in a trusted execution environment 110. The input device 116 may generate a payload 150 that includes data representative of the verified first authentication factor 132', data representative of the prior post-boot session credential 154 and a logical flag denoting the payload includes the prior post-boot session credential 154.

The authentication policy engine 112 may receive 356 the payload transmitted by the input device 116 responsive to the query, challenge, or call provided by the operating system. The authentication policy engine 112 may verify 358 the prior post-boot session credential 154. In embodiments, the authentication policy engine 112 may verify that the prior post-boot session credential 154 is logically associated with the immediately preceding post-boot session. Such beneficially prevents the reuse of post-boot session credentials logically associated with a post-boot session other than the immediately preceding post-boot session. In some instances, the authentication policy engine 112 may verify the prior post-boot session credential 154 included in the payload 150 against a credential value stored in the memory 108. In some instances, the authentication policy engine 112 may verify the prior post-boot session credential 154 included in the payload 150 against a modified credential value stored in the memory 108.

If the authentication policy engine 112 successfully verifies the prior post-boot session credentials 154 included in the payload 150, the processor circuit 104 may initiate 360 the current post-boot session 350. In embodiments, the processor circuit 104 may cause execution of a credential generator 114 in the trusted execution environment 110 during the current post-boot session 350. In embodiments, the credential generator 114 may generate or otherwise create a random or pseudo-random identifier (i.e., the current post-boot session credential) that is logically associated with the current post-boot session 350 by the processor circuit 104. In embodiments, the credential generator 114 may generate or otherwise create a random or pseudo-random nonce value (i.e., the current post-boot session credential)

that is logically associated with the current post-boot session 350 by the processor circuit 104. The processor circuit 104 may cause the storage of the current post-boot session credential in the memory 108. In at least some embodiments, the processor circuit 104 may cause the storage of the current post-boot session credential in the memory 108 by overwriting the prior post-boot session credential stored in the memory 108.

If the authentication policy engine is unsuccessful in verifying the prior post-boot session credentials 154 included in the payload 150, the processor circuit 104 may request 370 a second authentication factor from the system user. Upon receipt of the second authentication factor, the authentication policy engine 112 verifies 372 the second authentication factor. Upon successful verification of the second authentication factor by the authentication policy engine 112, the processor circuit 104 may initiate 360 the current post-boot session 350. Such represents a "step-up" authentication in which both pre-boot authentication and post-boot authentication may be employed during the current post-boot session.

Figure 4:
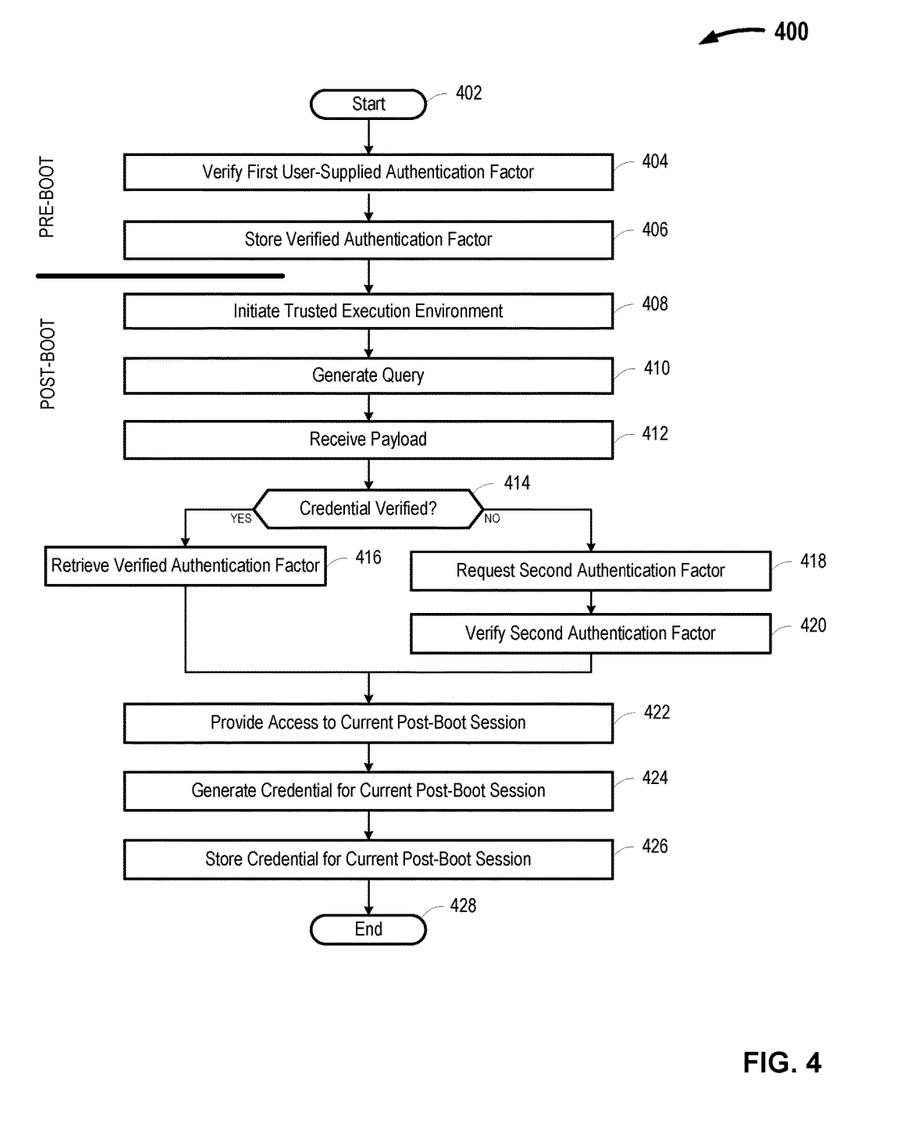
FIG. 4 is a high level logic flow diagram of an illustrative method in which a secure authentication system uses authentication information collected pre-boot to securely provide post-boot system access, in accordance with at least one embodiment of the present disclosure.

FIG. 4 is a high level logic flow diagram of an illustrative method 400 in which a secure authentication system uses authentication information collected during a pre-boot session to securely provide user access to a post-boot session, in accordance with at least one embodiment of the present disclosure. The method 400 commences at 402.

At 404, the first input device 116 verifies a first authentication factor 132 provided by a user. In some implementations, the user may provide the first authentication factor 132 directly to the first input device 116, for example via a keyboard, touchscreen, fingerprint sensor, facial recognition sensor, or the like. In some implementations, the user may provide the first authentication factor 132 via one or more user devices 130, such as via a SIM card in a smartphone. In at least some implementations, the first input device 116 may include one or more local or remote storage devices that include one or more data stores or databases that include data logically associating a number of first authentication factors 132 with a corresponding number of users.

At 406, the first input device 116 stores the verified first authentication factor 132'. In some instances, the verified first authentication factor 132' may be stored in the memory 108 of the processor-based device 102. In some implementations, the verified first authentication factor 132' may be stored in a memory location accessible both in the pre-boot session 330 and the post-boot session 350.

At 408, the processor circuit 104 initiates a trusted execution environment 110. In embodiments, the processor circuit 104 may cause the execution of an authentication policy engine 112 and/or a credential generator 114 in the trusted execution environment 110.

At 410, the processor circuit 104 generates a query or challenge that is communicated to the first input device 116. In response to the query or challenge, the first input device 116 generates a payload 150 that includes data representative of the verified first authentication factor 132', data representative of a prior post-boot session credential 154, and a logical indicator or flag 156 indicative of the presence of the data representative of a prior post-boot session credential 154.

At 412, the authentication policy engine 112 receives the payload 150 communicated by the first input device 116 in response to the query or challenge communicated by the processor circuit at 410.

At 414, the authentication policy engine 112 verifies the prior post-boot session credential 154 included in the payload 150 generated by the first input device 116. In at least some implementations, the authentication policy engine 112 may verify the prior post-boot session credential 154 included in the payload 150 against a stored and known valid post-boot session credential logically associated with an immediately preceding post-boot session.

If, at 414, the authentication policy engine 112 successfully verifies the prior post-boot session credential 154, at 416 the processor circuit 104 retrieves the verified first authentication factor 132' to initiate the current post-boot session 350.

If, at 414, the authentication policy engine 112 is unsuccessful in verifying the prior post-boot session credential 154, at 418 the processor circuit 104 requests a second authentication factor from the user. In some implementations, the second authentication factor may be the same as the first authentication factor 132. In some implementations, the second authentication factor may be different from the first authentication factor 132. At 420, the processor circuit 104 verifies the second authentication factor provided by the user at 418.

At 422, upon successful retrieval of the verified first authentication factor 132' at 416 or upon successful verification of the second authentication factor at 420, the processor circuit 104 provides access to the current post-boot session 350.

At 424, the processor circuit 104 may cause the credential generator 114 to generate a unique identifier logically associated with the current post-boot session 350 (i.e., the current post-boot session credential).

At 426, the processor circuit 104 may cause the credential generator 114 to store the current post-boot session credential in the memory 108. In some implementations, the processor circuit 104 may cause the credential generator 114 to overwrite the prior post-boot session credential in the memory with the current post-boot session credential. The method 400 concludes at 428.

Figure 5:
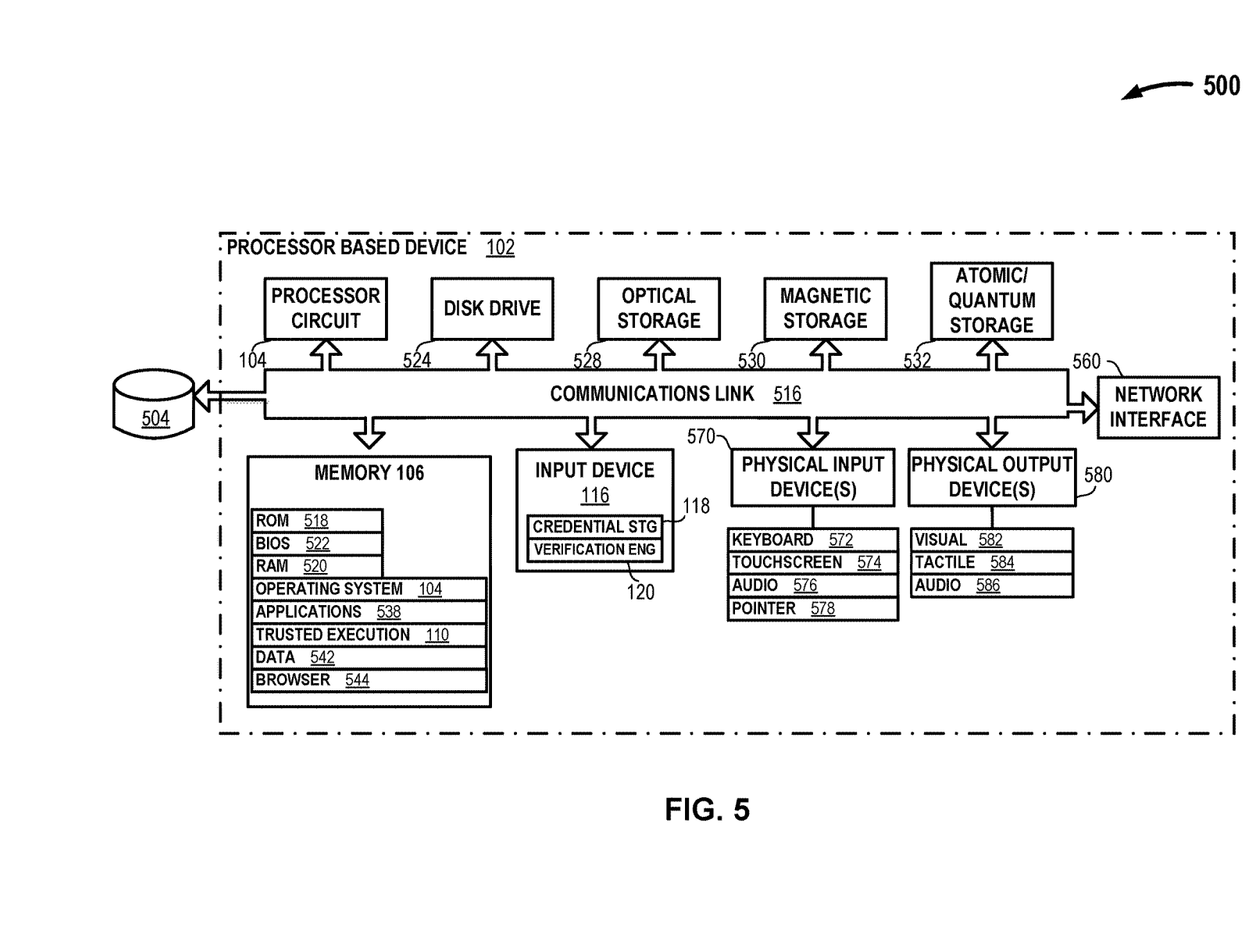
FIG. 5 is a block diagram of an illustrative processor-based device using a secure authentication protocol that uses authentication information collected pre-boot to securely provide post-boot system access, in accordance with at least one embodiment of the present disclosure.

FIG. 5 depicts a processor-based environment 500 in the secure authentication protocol may be incorporated, in accordance with at least one embodiment of the present disclosure. The processor-based device 102 may, on occasion, include one or more processor-based devices 102 communicably coupled to one or more nontransitory processor-readable storage devices 504. The associated nontransitory processor-readable storage medium 504 is communicatively coupled to the one or more processor-based devices 102 via one or more communications links 516, for example one or more parallel cables, serial cables, or wireless channels capable of high speed communications, for instance via BLUETOOTH®, universal serial bus (USB), FIREWIRE®, or similar.

The one or more processor-based devices 102 may be communicably coupled to one or more external devices, for example user device 130, using one or more wireless or wired network interfaces 560. Example wireless network interfaces 560 may include, but are not limited to, BLUETOOTH®, near field communications (NFC), ZigBee, IEEE 802.11 (Wi-Fi), 3G, 4G, LTE, CDMA, GSM, and similar. Example wired network interfaces 560 may include, but are not limited to, IEEE 802.3 (Ethernet), and similar. Unless described otherwise, the construction and operation of the various blocks shown in FIG. 5 are of conventional design. As a result, such blocks need not be described in further detail herein, as they will be understood by those skilled in the relevant art.

The processor-based system 500 may include one or more circuits capable of executing processor-readable instructions to provide any number of particular and/or specialized processor circuits 104, a system memory 106 and a system communications link 516 that bidirectionally communicably couples various system components including the system memory 106 to the processor circuit(s) 104. The processor circuit(s) 104 may include, but are not limited to, any circuit capable of executing one or more machine-readable and/or processor-readable instruction sets, such as one or more single or multi-core central processing units (CPUs), digital signal processors (DSPs), application-specific integrated circuits (ASICs), field programmable gate arrays (FPGAs), systems on a chip (SOCs), etc. The communications link 516 may employ any known bus structures or architectures, including a memory bus with memory controller, a peripheral bus, and/or a local bus. The system memory 106 includes read-only memory ("ROM") 518 and random access memory ("RAM") 520. A basic input/output system ("BIOS") 522, which may, on occasion, form part of the ROM 518, contains basic routines that may cause the transfer information between elements within the processor-based device 102, such as during start-up.

The processor-based device 102 may include one or more disk drives 524, one or more optical storage devices 528, one or more magnetic storage devices 530, and/or one or more atomic or quantum storage devices 532. The one or more optical storage devices 528 may include, but are not limited to, any current or future developed optical storage drives (e.g., compact disc (CD), digital versatile disk (DVD), and similar). The one or more magnetic storage devices 530 may include, but are not limited to, any type of current or future developed rotating or stationary device in which data is stored in a magnetic and/or electromagnetic format such as a solid-state drive (SSD) and various forms of removable storage media (e.g., secure digital (SD), secure digital high capacity (SD-HC), universal serial bus (USB) memory stick, and similar). The one or more atomic or quantum storage devices may include, but are not limited to, any current or future developed atomic spin, molecular storage devices. The one or more disk drives 524, the one or more optical storage devices 528, the one or more magnetic storage devices 530, and the one or more atomic/quantum storage devices 532 may include integral or discrete interfaces or controllers (not shown).

Machine-readable instruction sets may be stored or otherwise retained in whole or in part in the system memory 106. Such machine-readable instruction sets may include, but are not limited to an operating system 104, one or more application instruction sets 538, system, program, and/or application data 542, and one or more communications applications such as a Web browser 544. In at least some implementations, the processor circuit 104 may utilize at least a portion of the system memory 106 to provide at least a portion of the trusted execution environment 110. While shown in FIG. 5 as being stored in the system memory 106, the operating system 104, application instruction sets 538, system, program, and/or application data 542 and browser 544 may, on occasion, be stored in whole or in part on one or more other storage devices such as the one or more disk drives 524, the one or more optical storage devices 528, the one or more magnetic storage devices 530, and/or one or more atomic or quantum storage devices 532.

The input device 116 may be communicably coupled to the processor circuit 104 via the communications link 516. The input device 116 may include any type, number, or combination of input devices capable of receiving a user-supplied input in the pre-boot session. Such use supplied input may include, but is not limited to, input used to initiate the boot or start-up of the system. In one example, such an input may include the input device 116 receiving and verifying a user-supplied biometric value (e.g., fingerprint, retina scan) prior to initiating the pre-boot session.

A system user may enter commands and information into the processor-based device 102 using one or more physical input devices 570. Example physical input devices 570 include, but are not limited to, one or more keyboards 572, one or more touchscreen I/O devices 574, one or more audio input devices 576 (e.g., microphone) and/or one or more pointing devices 578. These and other physical input devices may be communicably coupled the processor-based device 102 through one or more wired or wireless interfaces such as a wired universal serial bus (USB) connection and/or a wireless BLUETOOTH® connection.

The system user may receive output from the processor-based device 102 via one or more physical output devices 580. Example physical output devices 580 may include, but are not limited to, one or more visual or video output devices 582, one or more tactile or haptic output devices 584, and/or one or more audio output devices 586. The one or more video or visual output devices 582, the one or more tactile output devices 584, and the one or more audio output devices 586 may be communicably coupled to the communications link 516 via one or more interfaces or adapters.

The following examples pertain to embodiments that employ some or all of the described authentication apparatuses, systems, and methods described herein. The enclosed examples should not be considered exhaustive, nor should the enclosed examples be construed to exclude other combinations of the systems, methods, and apparatuses disclosed herein and which are not specifically enumerated herein.

According to example 1, there is provided a system for transferring authentication protocols between a sensor and a platform. The system may include a first input device that, in a pre-boot session, verifies received data representative of a first user authentication factor, stores the verified first user authentication data, and stores a credential logically associated with a prior session. The system may additionally include at least one circuit communicably coupled to the first input device. The system may further include a data storage device communicably coupled to the at least one circuit, the data storage device including machine-readable instructions. The machine-readable instructions cause the at least one circuit to provide an authentication engine and causes the authentication engine to, in a post-boot session, communicate a query to the first input device, receive the verified first user authentication data and the prior session credential from the first input device in response to the communicated query, and verify the prior session credential received from the first input device.

Example 2 may include elements of example 1 where the at least one circuit provides the authentication engine in a trusted execution environment.

Example 3 may include elements of example 2 where the machine-readable instructions may cause the at least one circuit to cause the authentication engine to further cause a credential generator to generate a current post-boot session credential and replace the stored prior post-boot session credential with the current post-boot session credential.

Example 4 may include elements of example 3 where the machine-readable instructions may cause the at least one circuit to cause the authentication engine to further provide user access to the post-boot environment responsive to a successful verification of the prior post-boot session credential by the authentication engine.

Example 5 may include elements of example 4 where the machine-readable instructions may cause the at least one circuit to cause the authentication engine to further request a second authentication factor responsive to an unsuccessful verification of the prior post-boot session credential by the authentication engine.

Example 6 may include elements of example 5 where the machine-readable instructions may cause the at least one circuit to cause the authentication engine to further provide user access to the current post-boot session responsive to a successful verification of the second authentication factor by the authentication engine.

Example 7 may include elements of any of examples 1 through 6 where the first input device may further receive data representative of a user-supplied first authentication factor.

Example 8 may include elements of example 7 where the first input device may include at least one of: a knowledge factor input device, a possession factor input device, an inherence factor input device, a location factor input device, or a time factor input device.

Example 9 may include elements of any of examples 1 through 6 where the credential may include a nonce previously supplied by the authentication engine to the data acquisition device.

Example 10 may include elements of any of examples 1 through 6 where the credential may include a calculated value based at least in part on a known value previously supplied by the authentication engine to the data acquisition device.

According to example 11, there is provided an authentication method. The method may include, during a pre-boot session, verifying, by a first input device, a first authentication factor, storing, by the first input device, the verified first authentication factor, and storing, by the first input device, a credential logically associated with a prior post-boot session. The method may also include, during a current post-boot session, generating, by an authentication engine, a query, communicating, by the authentication engine, the query to the first input device, receiving, by the authentication engine, the verified first user authentication data and the prior post-boot session credential from the first input device in response to the communicated query, and verifying, by the authentication engine, the received prior post-boot session credential.

Example 12 may include elements of example 11 where verifying the prior post-boot session credential may include verifying, by the authentication engine, the prior post-boot session credential includes at least one credential representative of an immediately preceding post-boot session.

Example 13 may include elements of example 12, and may additionally include during the current post-boot session generating, by a credential generator, a credential logically associated with the current post-boot session, and overwriting, by the authentication engine, the prior post-boot session credential with the current post-boot session credential.

Example 14 may include elements of example 11, and may additionally include, causing at least one circuit to execute at least one machine-readable instruction set that causes the at least one circuit to provide at least a portion of the authentication engine.

Example 15 may include elements of example 14 where causing at least one circuit to execute at least one machine-readable instruction set that causes the at least one circuit to provide at least a portion of the authentication engine may include causing the least one circuit to execute, in a trusted execution environment, at least one machine-readable instruction set that causes the at least one circuit to provide at least a portion of the authentication engine.

Example 16 may include elements of example 11, and may additionally include, receiving, by the first input device, a user-supplied first authentication factor.

Example 17 may include elements of example 16 where receiving the user-supplied first authentication factor may include receiving, by the first input device, at least one of: a knowledge factor, a possession factor, an inherence factor, a location factor, or a time factor.

Example 18 may include elements of any of examples 11 through 17, and may additionally include, providing, by the authentication engine, user access to the current post-boot session responsive to successful verification of the first user authentication factor by the authentication engine.

Example 19 may include elements of any of examples 11 through 17, and may additionally include requesting, by the authentication engine, a second authentication factor responsive to an unsuccessful verification of the stored prior post-boot session credential and verifying, by the authentication engine, the second authentication factor prior to providing user access to the current post-boot session.

Example 20 may include elements of example 19 where requesting a second authentication factor may include requesting, by the authentication engine, at least one of: the first authentication factor or the second authentication factor.

Example 21 may include elements of example 20 where verifying the second user supplied authentication factor may include verifying, by the authentication engine, at least one of: the first authentication factor or the second authentication factor.

According to example 22, there is provided an authentication system that may include, during a pre-boot session, a means for verifying a first authentication factor, a means for storing the first authentication factor, and a means for storing a credential logically associated with a prior post-boot session. The system may further include, during a current post-boot session, a means for generating a query, a means for communicating the generated query to a first input device, a means for receiving the verified first user authentication data and the prior post-boot session credential from the first input device in response to the communicated query, and a means for verifying the received prior post-boot session credential.

Example 23 may include elements of example 22 where the means for verifying the prior post-boot session credential may include a means for verifying the prior post-boot session credential includes at least one credential logically associated with an immediately preceding post-boot session.

Example 24 may include elements of example 23, and may further include, during the current post-boot session, a means for generating a credential logically associated with the current post-boot session and a means for overwriting the prior post-boot session credential with the current post-boot session credential.

Example 25 may include elements of example 22, and may further include, a means for causing at least one circuit to execute at least one machine-readable instruction set that causes the at least one circuit to provide at least a portion of the authentication engine.

Example 26 may include elements of example 25 where the means causing at least one circuit to execute at least one machine-readable instruction set that causes the at least one circuit to provide at least a portion of the authentication engine may include a means for causing the least one circuit to execute, in a trusted execution environment, at least one machine-readable instruction set that causes the at least one circuit to provide at least a portion of the authentication engine.

Example 27 may include elements of example 22, and may additionally include, during the pre-boot session, a means for receiving a user-supplied first authentication factor.

Example 28 may include elements of example 27 where the means for receiving the user-supplied first authentication factor may include a means for receiving at least one of: a knowledge factor, a possession factor, an inherence factor, a location factor, or a time factor.

Example 29 may include elements of any of examples 22 through 28, and may additionally include a means for providing user access to the current post-boot session responsive to a successful verification of the first authentication factor.

Example 30 may include elements of any of examples 22 through 28, and may additionally include a means for requesting a second authentication factor responsive to an unsuccessful verification of the stored prior session credential and a means for verifying the second authentication factor prior to providing user access to a post-boot environment.

Example 31 may include elements of example 30 where the means for requesting a second user-supplied authentication factor may include a means for requesting at least one of: the first authentication factor or the second authentication factor.

Example 32 may include elements of example 31 where the means for verifying the second user supplied authentication factor may include a means for verifying at least one of: the first authentication factor or the second authentication factor.

According to example 33, there is provided a storage device that includes machine-readable instructions, that when executed by a circuit, may cause the circuit to, during a pre-boot session, cause a first input device to verify a first authentication factor, store the first authentication factor, and store a credential logically associated with a prior post-boot session. The storage device may additionally include machine-readable instructions, that when executed by a circuit, cause the circuit to, during a current post-boot session, cause an authentication engine to generate a query, communicate the generated query to the first input device, receive the verified first user authentication data and the prior post-boot session credential from the first input device in response to the communicated query, and verify the received prior post-boot session credential.

Example 34 may include elements of example 33 where the machine-readable instructions that cause the authentication engine to verify the received prior session credential may further cause the authentication engine to verify the stored prior post-boot session credential includes at least one credential logically associated with an immediately preceding post-boot session.

Example 35 may include elements of example 33 where the machine-readable instructions may further cause the circuit to, during the post-boot session, cause a credential generator to generate a credential logically associated with the current post-boot session and cause the authentication engine to overwrite the prior post-boot session credential with the current post-boot session credential.

Example 36 may include elements of example 33 where the machine-readable instructions that cause the circuit to provide the authentication engine may further cause the circuit to provide the authentication engine in a trusted execution environment.

Example 37 may include elements of example 33 where the machine readable instructions may further cause the at least one input device to, during the pre-boot session, receive a user-supplied first authentication factor.

Example 38 may include elements of example 37 where the machine-readable instructions that cause the at least one input device to receive the user-supplied first authentication factor, may further cause the at least one input device to, during the pre-boot session, receive at least one of: a knowledge factor, a possession factor, an inherence factor, a location factor, or a time factor.

Example 39 may include elements of any of examples 33 through 38 where the machine readable instructions may further cause the circuit to cause the authentication engine to, during the current post-boot session, provide user access to the current post-boot session responsive to a successful verification of the first authentication factor.

Example 40 may include elements of any of examples 33 through 38 where the machine readable instructions may further cause the circuit to cause the authentication engine to, during the current post-boot session, request a second authentication factor responsive to an unsuccessful verification of the stored prior post-boot session credential and verify the second authentication factor prior to providing user access to the current post-boot session.

Example 41 may include elements of example 40 where the machine-readable instructions that cause the authentication engine to request a second user-supplied authentication factor, may further cause the authentication engine to request at least one of: the first authentication factor or the second authentication factor.

Example 42 may include elements of example 41 where the machine-readable instructions that cause the authentication engine to verify the second user supplied authentication factor, may further cause the authentication engine to verify at least one of: the first authentication factor or the second authentication factor.

According to example 43, there is provided a system for transferring authentication protocols between a sensor and a platform, the system being arranged to perform the method of any of examples 11 through 21.

According to example 44, there is provided a chipset to perform the method of any of examples 11 through 21.

According to example 45, there is provided at least one machine readable medium comprising a plurality of instructions that, in response to be being executed on a computing device, cause the computing device to carry out the method according to any of examples 11 through 21.

According to example 46, there is provided a device configured for provision of supporting content, the device being arranged to perform the method of any of examples 11 through 21.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A system for transferring authentication protocols between a sensor and a platform, the system comprising:
an input device to, during a pre-boot session:

verify received data representative of a first authentication factor;
store the verified first authentication factor;
store a credential logically associated with a prior session; and
verify the prior session using a prior session credential, wherein the prior session credential is logically associated with an immediately previous post-boot environment that includes a defined change that includes incrementing or decrementing the immediately previous post-boot environment by a defined value; and
an authentication engine to, during a current post-boot session:
receive the prior session credential from the input device and verify the prior session credential using the verified first authentication factor; and
generate a current post-boot session credential that is logically associated with the current post-boot session.

2. The system of claim 1, further comprising trusted execution environment circuitry to provide and execute the authentication engine.

3. The system of claim 1 wherein the authentication engine is further to replace a prior post-boot session credential with the current post-boot session credential.

4. The system of claim 3 wherein the authentication engine is further to provide user access to the current post-boot environment responsive to a successful verification of the prior post-boot session credential.

5. The system of claim 3 wherein the authentication engine is further to request a second authentication factor responsive to an unsuccessful verification of the prior post-boot session credential.

6. The system of claim 5 wherein the authentication engine is further to provide user access to the current post-boot session responsive to a successful verification of the second authentication factor.

7. The system of claim 1 wherein the input device is further to receive data representative of a user-supplied first authentication factor.

8. The system of claim 7 wherein the input device comprises at least one of: a knowledge factor input device, a possession factor input device, an inherence factor input device, a location factor input device, or a time factor input device.

9. The system of claim 1 wherein the prior session credential includes a nonce value previously supplied by the authentication engine to the input device.

10. The system of claim 1 wherein the prior session credential includes a calculated value based at least in part on a known value previously supplied by the authentication engine to the input device.

11. An authentication method, comprising:
during a pre-boot session:
verifying, by an input device, a first authentication factor;
storing, by the input device, the verified first authentication factor;
storing, by the input device, a credential logically associated with a prior post-boot session; and
verifying the prior post-boot session using a credential logically associated with an immediately previous post-boot environment that includes a defined change that includes incrementing or decrementing the immediately previous post-boot environment by a defined value; and during a current post-boot session:
receiving, by an authentication engine, the prior post-boot session credential from the input device and verifying the prior post-boot session credential using the verified first authentication factor; and
generating a current post-boot session credential that is logically associated with the current post-boot session.

12. The method of claim 11 wherein verifying the prior post-boot session credential comprises verifying that the prior post-boot session credential includes at least one credential representative of an immediately preceding post-boot session.

13. The method of claim 12 further comprising, during the current post-boot session, overwriting the prior post-boot session credential with the current post-boot session credential.

14. The method of claim 11, further comprising causing at least one circuit to execute at least one machine-readable instruction set that causes the at least one circuit to provide at least a portion of the authentication engine via a trusted execution environment.

15. The method of claim 11 further comprising, during the current post-boot session, generating a query via the authentication engine and providing the generated query to the input device, wherein the receiving by the authentication engine of the prior post-boot session credential from the input device is responsive to the providing of the generated query.

16. The method of claim 11 further comprising receiving, during the pre-boot session, the first authentication factor from a user.

17. The method of claim 16 wherein receiving the first authentication factor from the user comprises:
receiving, via the input device, at least one of: a knowledge factor, a possession factor, an inherence factor, a location factor, or a time factor.

18. The method of claim 11, further comprising:
providing, via the authentication engine, user access to the current post-boot session responsive to successful verification of the first authentication factor.

19. The method of claim 11, further comprising:
requesting, by the authentication engine, a second authentication factor responsive to an unsuccessful verification of the stored prior post-boot session credential; and
verifying, by the authentication engine, the second authentication factor prior to providing user access to the current post-boot session.

20. The method of claim 19 wherein requesting a second authentication factor comprises requesting, by the authentication engine, at least one of the first authentication factor or the second authentication factor.

21. The method of claim 19 wherein verifying the second authentication factor comprises verifying, by the authentication engine, at least one of the first authentication factor or the second authentication factor.

22. An authentication system, comprising:
means for verifying, during a pre-boot session, a first authentication factor;
means for storing, during the pre-boot session, the verified first authentication factor;
means for storing, during the pre-boot session, a credential logically associated with a prior post-boot session;
means for verifying, during the pre-boot session, the prior post-boot session using a credential logically associated with an immediately previous post-boot environment that includes a defined change that includes incrementing or decrementing the immediately previous post-boot environment by a defined value;

means for receiving, during a current post-boot session, the prior post-boot session credential;

means for verifying, during the current post-boot session, the received prior post-boot session credential; and means for generating, during the current post-boot session, a credential that is logically associated with the post-boot session.

23. The system of claim 22 wherein verifying the received prior post-boot session credential comprises verifying that the prior post-boot session credential includes at least one credential logically associated with an immediately preceding post-boot session.

24. A storage device including machine-readable instructions that, when executed by one or more circuits, cause the one or more circuits to:

during a pre-boot session:
   verify, via an input device, a first authentication factor;
   store, via the input device, the verified first authentication factor;
   store, via the input device, a credential logically associated with a prior post-boot session; and
   verify the prior post-boot session using a credential logically associated with an immediately previous post-boot environment that includes a defined change that includes incrementing or decrementing the immediately previous post-boot environment by a defined value; and during a current post-boot session:
   receive, by an authentication engine, the prior post-boot session credential from the input device and verifying the prior post-boot session credential using the verified first authentication factor; and
   generate a current post-boot session credential that is logically associated with the current post-boot session.

25. The storage device of claim 24, wherein the machine-readable instructions further cause the authentication engine to verify that the stored prior post-boot session credential includes at least one credential logically associated with an immediately preceding post-boot session.

* * * * *